(12) United States Patent
Reineke et al.

(10) Patent No.: US 10,977,153 B1
(45) Date of Patent: Apr. 13, 2021

(54) METHOD AND SYSTEM FOR GENERATING DIGITAL TWINS OF RESOURCE POOLS AND RESOURCE POOL DEVICES

(71) Applicant: EMC IP Holding Company LLC, Hopkinton, MA (US)

(72) Inventors: Nicole Reineke, Northborough, MA (US); James Robert King, Norwood, MA (US); Robert Anthony Lincourt, Jr., Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/671,537

(22) Filed: Nov. 1, 2019

(51) Int. Cl.
*G06F 11/34* (2006.01)
*G06F 9/50* (2006.01)
*G06F 11/30* (2006.01)

(52) U.S. Cl.
CPC .......... *G06F 11/349* (2013.01); *G06F 9/5011* (2013.01); *G06F 11/3006* (2013.01); *G06F 11/3495* (2013.01); *G06F 2209/5011* (2013.01)

(58) Field of Classification Search
CPC ........................ G06F 13/4004; G06Q 10/0639
See application file for complete search history.

(56) References Cited

U.S. PATENT DOCUMENTS

| | | | |
|---|---|---|---|
| 6,070,144 A * | 5/2000 | Ginsberg | G06Q 10/06 705/7.17 |
| 10,042,636 B1 * | 8/2018 | Srivastava | G06N 5/022 |
| 2015/0317173 A1 | 11/2015 | Anglin | |
| 2016/0011881 A1 | 1/2016 | Suzuki | |
| 2016/0182293 A1 | 6/2016 | Di Benedetto | |
| 2019/0018710 A1 | 1/2019 | Ambardekar | |
| 2019/0138970 A1 * | 5/2019 | Deutsch | G06F 9/542 |
| 2019/0182117 A1 | 6/2019 | Bower, III | |
| 2019/0266117 A1 * | 8/2019 | Duncan | G06F 13/24 |
| 2019/0324874 A1 | 10/2019 | Gill | |
| 2020/0225655 A1 * | 7/2020 | Cella | G05B 19/41875 |
| 2020/0294006 A1 * | 9/2020 | Hadi | G06Q 20/0655 |

* cited by examiner

*Primary Examiner* — Getente A Yimer
(74) *Attorney, Agent, or Firm* — Chamberlain, Hrdlicka, White, Williams & Aughtry

(57) ABSTRACT

A method for managing pool device resources, the method comprising: obtaining, by a digital twin service, a digital twin generation request, wherein the digital twin generation request specifies a pool device, identifying a plurality of PCI bus device being used by the pool device associated with the digital twin generation request, obtaining configuration information associated with the plurality of PCI bus devices, initiating a resource allocation using a virtual switch to access a peripheral component interconnect (PCI) bus device on a second pool device based on the configuration information and the plurality of PCI bus devices, performing performance calculations on the PCI bus device based on the resource allocation, and storing a result of the performance calculations.

20 Claims, 9 Drawing Sheets

METHOD AND SYSTEM FOR GENERATING DIGITAL TWINS OF RESOURCE POOLS AND RESOURCE POOL DEVICES

BACKGROUND

Systems may include multiple computing devices. Each computing device may include computing resources. The computing resources may not be used by all computing devices at all times.

SUMMARY

In general, in one aspect, the invention relates to a method for managing pool device resources, the method includes obtaining, by a digital twin service, a digital twin generation request, wherein the digital twin generation request specifies a pool device, identifying a plurality of PCI bus device being used by the pool device associated with the digital twin generation request, obtaining configuration information associated with the plurality of PCI bus devices, initiating a resource allocation using a virtual switch to access a peripheral component interconnect (PCI) bus device on a second pool device based on the configuration information and the plurality of PCI bus devices, performing performance calculations on the PCI bus device based on the resource allocation, and storing a result of the performance calculations.

In general, in one aspect, the invention relates to a non-transitory computer readable medium comprising computer readable program code, which when executed by a computer processor enables the computer processor to perform a method, the method comprising: obtaining, by a digital twin service, a digital twin generation request, wherein the digital twin generation request specifies a pool device; identifying a plurality of PCI bus device being used by the pool device associated with the digital twin generation request; obtaining configuration information associated with the plurality of PCI bus devices; initiating a resource allocation using a virtual switch to access a peripheral component interconnect (PCI) bus device on a second pool device based on the configuration information and the plurality of PCI bus devices; performing performance calculations on the PCI bus device based on the resource allocation; and storing a result of the performance calculations.

In general, in one aspect, the invention relates to a digital twin service programmed to: obtain, by a digital twin service, a digital twin generation request, wherein the digital twin generation request specifies a pool device; identify a plurality of PCI bus device being used by the pool device associated with the digital twin generation request; obtain configuration information associated with the plurality of PCI bus device; initiate a resource allocation using a virtual switch to access a peripheral component interconnect (PCI) bus device on a second pool device based on the configuration information and the plurality of PCI bus devices; perform performance calculations on the PCI bus device based on the resource allocation; and store a result of the performance calculations.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing pool device resources. Specifically, embodiments of the invention relate to a system that enables a pool devices of a resource pool(s) to access the pool device resources of other pool devices in the resource pool(s). The method may utilize a ledger service that stores immutable entries that specify which pool device resources of pool devices are in use by other pool devices. Embodiments of the invention may include using virtual switches of the pool device to establish a connection to one or more peripheral component interconnect (PCI) bus devices of the other pool devices. The PCI bus devices may be connected to the pool device resources of the other pool devices. In this manner, a given pool device may discover, access, and use a pool device resource on another device.

Figure 1:
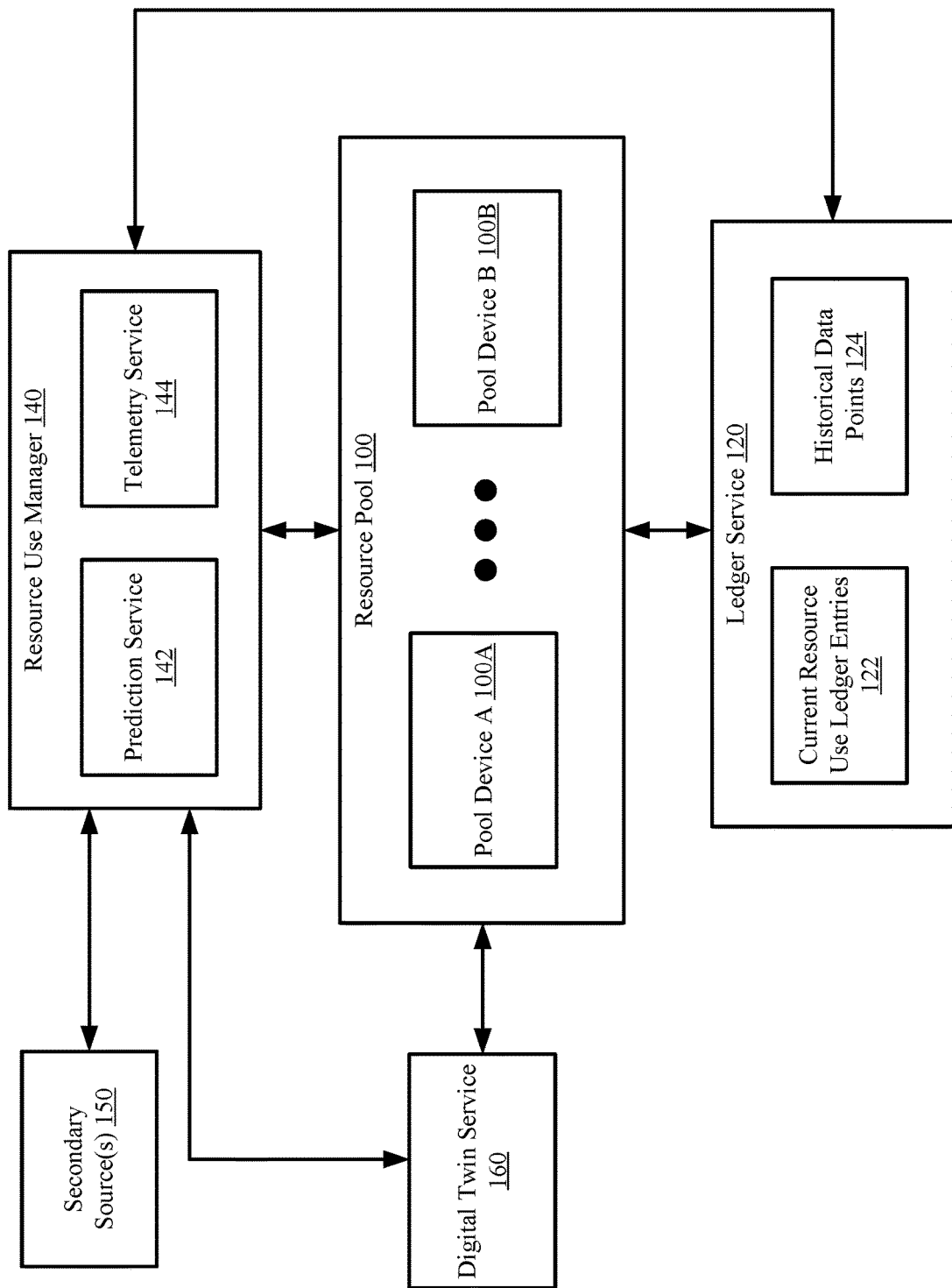
FIG. 1 shows a diagram of a system in accordance with one or more embodiments of the invention.

FIG. 1 shows a diagram of a system in accordance with one or more embodiments of the invention. The system includes one or more resource pools (100), a ledger service (120), a resource use manager (140), one or more secondary sources (150), and a digital twin service (160). Each component of the system may be operably connected via any combination of wired and/or wireless connections. The system may include additional, fewer, and/or different components without departing from the invention. Each component of the system illustrated in FIG. 1 is discussed below.

In one or more embodiments of the invention, the resource pool (100) is a logical grouping of pool devices (100A, 100B), each of which may obtain data, stores data, provide data, and/or execute applications. The resource pool (100) may be enabled to allow any pool device (100) to access the pool device resources of other pool devices (100A, 100B) in the resource pool (100). Further, the resource pool (100) may be enabled to access the computing devices of other resource pools (not shown) using a ledger service (120).

Figure 5:
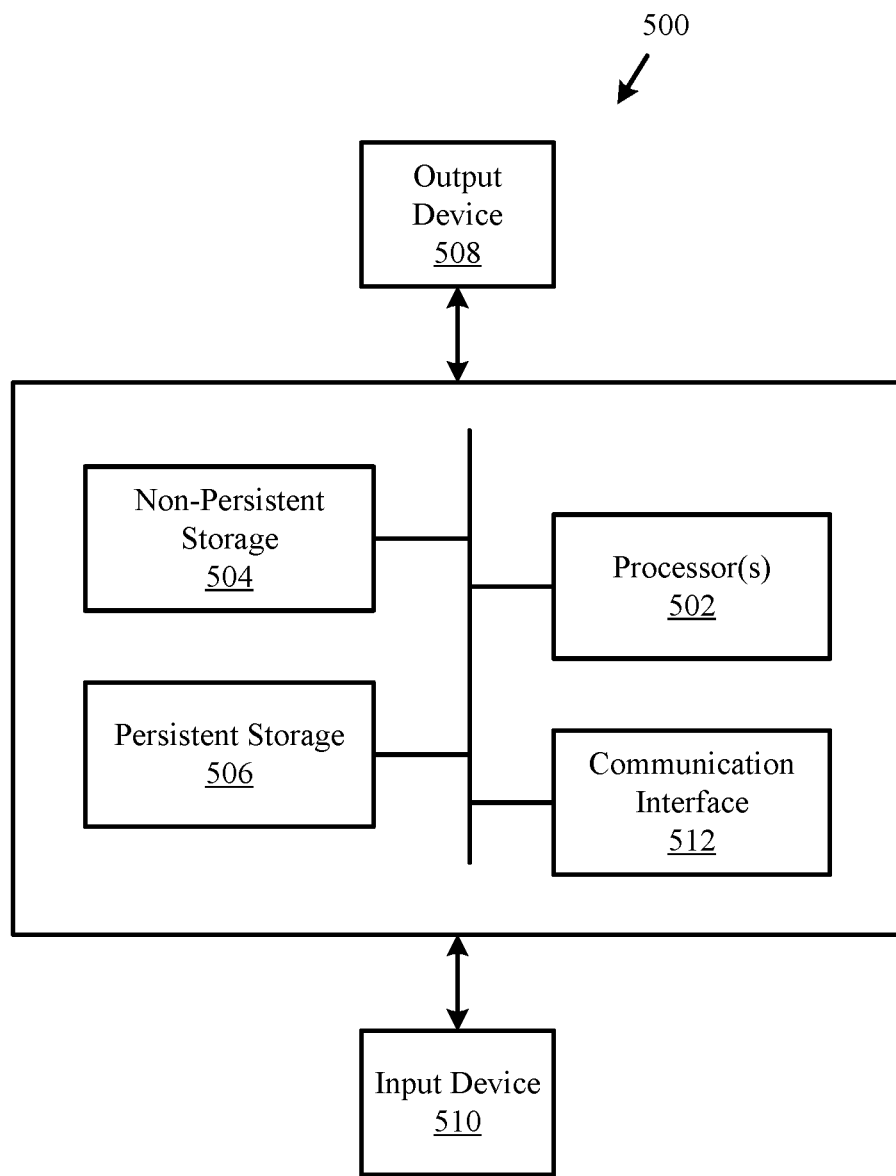
FIG. 5 shows a diagram of a computing device in accordance with one or more embodiments of the invention.

In one or more embodiments of the invention, each pool device (100A, 100B) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the pool device (100A, 100B) described throughout this application and/or all, or portion, of the method illustrated in FIG. 3A. For additional details regarding a pool device (100A, 100B), see, e.g., FIG. 2.

In one or more embodiments of the invention, a ledger service (120) is a service that stores data and/or metadata obtained from the resource pool (100). The ledger service (120) may include functionality to store immutable entries, where each entry specifies a PCI bus device, usage (or availability) of PCI bus device, and the pool device resource to which PCI bus device is connected.

In one or more embodiments of the invention, the ledger service (120) includes current resource use ledger entries (122). The current resource use ledger entries (also referred to as ledger entries) (122) may be data structures that specify the availability of pool device resources in the resource pool (100). The ledger entries may specify a peripheral component interconnect (PCI) bus device of a pool device (discussed in FIG. 2) and/or its availability for use by other pool devices. If a pool device accesses a PCI bus device of a second pool device, the use is registered in a ledger entry that specifies the use and the aforementioned entry is updated to reflect the availability of the PCI bus device as "not available." In this context, "not available" may refer to the inability of: (i) the pool device on which the PCI bus device to use the PCI bus device and/or (ii) other pool devices to use the aforementioned PCI bus device.

After the use is complete, the availability of the PCI bus device is reflected in an entry in the ledger service as "available." In this manner, the ledger service (120) may be used to prevent more than one pool device from using (or attempting to use) a PCI bus device.

In one or more embodiments of the invention, the ledger service (120) further includes historical data points (124) that specify previous allocations of pool device resources between the pool devices (100A, 100B). The historical data points (124) may be stored in entries that specify, on a per-PCI bus device: (i) an identifier of the PCI bus device; (ii) the pool device that was utilizing the PCI bus device, and (iii) a timestamp that specifies the period of time in which the PCI bus device was used. Each entry in the historical data points (124) may include other information without departing from the invention.

In one or more embodiments of the invention, the ledger service (120) is implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the ledger service (120) described throughout this application.

In one or more embodiments of the invention, the ledger service (120) is implemented as a logical device. The logical device may utilize pool device resources of any number of physical computing devices to provide the functionality of the ledger service (120) described throughout this application.

In one or more embodiments of the invention, the ledger service (120) is implemented as a distributed ledger (e.g., a block chain). The distributed ledger may utilize pool device resources of any number of physical computing devices (see e.g., FIG. 5) to provide the functionality of the ledger service (120) described throughout this application.

In one or more embodiments of the invention, the resource use manager (140) manages the pool device resource use of the pool device resources of the resource pool (100). In one or more embodiments of the invention, the resource use manager (140) manages the pool device resources by performing the method of FIG. 3B to generate a prediction model using the historical data points (122) of the ledger service (120). The prediction model may be used to predict future usage of the resource pool (or, more specifically, of the PCI bus devices in the resource pool). The resource use manager (140) may initiate resource allocations based on the prediction model. The prediction model (140) may be generated based on the secondary sources (150) (defined below) in addition to the historical data points (122).

In one or more embodiments of the invention, the resource use manager (140) includes a telemetry service (144) that obtains the historical data points (124) and/or monitors the usage of the pool device resources in the resource pool (100) to gather training data for the prediction service (142).

In one or more embodiments of the invention, the prediction service (142) generates a prediction model using training data obtained from the telemetry service (144). The prediction service (142) may perform the method of FIG. 3B to generate the prediction model.

In one or more embodiments of the invention, the resource use manager (140) is implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the resource use manager (140) described in this application and/or all, or portion, of the methods illustrated in FIG. 3B.

The resource use manager (140) may be implemented as a logical device without departing from the invention. The logical device utilizes pool device resources of any number of physical computing devices to provide the functionality of the resource use manager (140) described throughout this application and/or all, or portion, of the methods illustrated in FIG. 3B.

In one or more embodiments of the invention, the secondary sources (150) obtain data and/or other information from real-life processes. The data and/or information may be provided to the resource use manager (140) to use in prediction of future resource use. The real-life occurrences may be, for example, one or more people's schedules for work, weather patterns, geographical locations, and/or any other occurrences that may impact the demand of one or more pool devices (or, more specifically, one or more PCI bus devices).

For example, consider a scenario in which a first pool device in an example resource pool operates at an airport. The first pool device, when checking in passengers boarding a flight, may require pool device resources in additional to the pool device resources available on the first pool device. During check-in, the first pool device may utilize a processor (accessed via a PCI bus device) of a second pool device. A secondary source specifying the schedule of flights in the airport may be used by the resource use manager (140) to predict future demand of additional resources by the first computing device. The prediction may be used to proactively allocate the additional pool device resources to the first pool device from other pool devices.

In one or more embodiments of the invention, the digital twin service (160) includes functionality for initiating a generation of digital twins. In one or more embodiments of the invention, the digital twin generation is initiated via the method of FIG. 3C. The digital twin service (160) may communicate with the resource pool (100) to identify the pool device resources of each pool device (100A, 100B) and to obtain configuration information of the pool devices (100A, 100B). The configuration information and the identified pool device resources of a pool device (100A, 100B) may be used to generate a digital twin of the pool device (100A, 100B).

In one or more embodiments of the invention, a digital twin is a digital model of a pool device (e.g., 100A, 100B) and/or a resource pool (e.g., 100). The digital model may be computing code that models the behavior of the pool device or resource pool. The behavior may include mimicking the capability of the pool device (including the behavior of the PCI bus devices located thereon). The behavior may be used to, for example, simulate the pool device and/or resource pool.

The invention is not limited to the architecture shown in FIG. 1.

Figure 2:
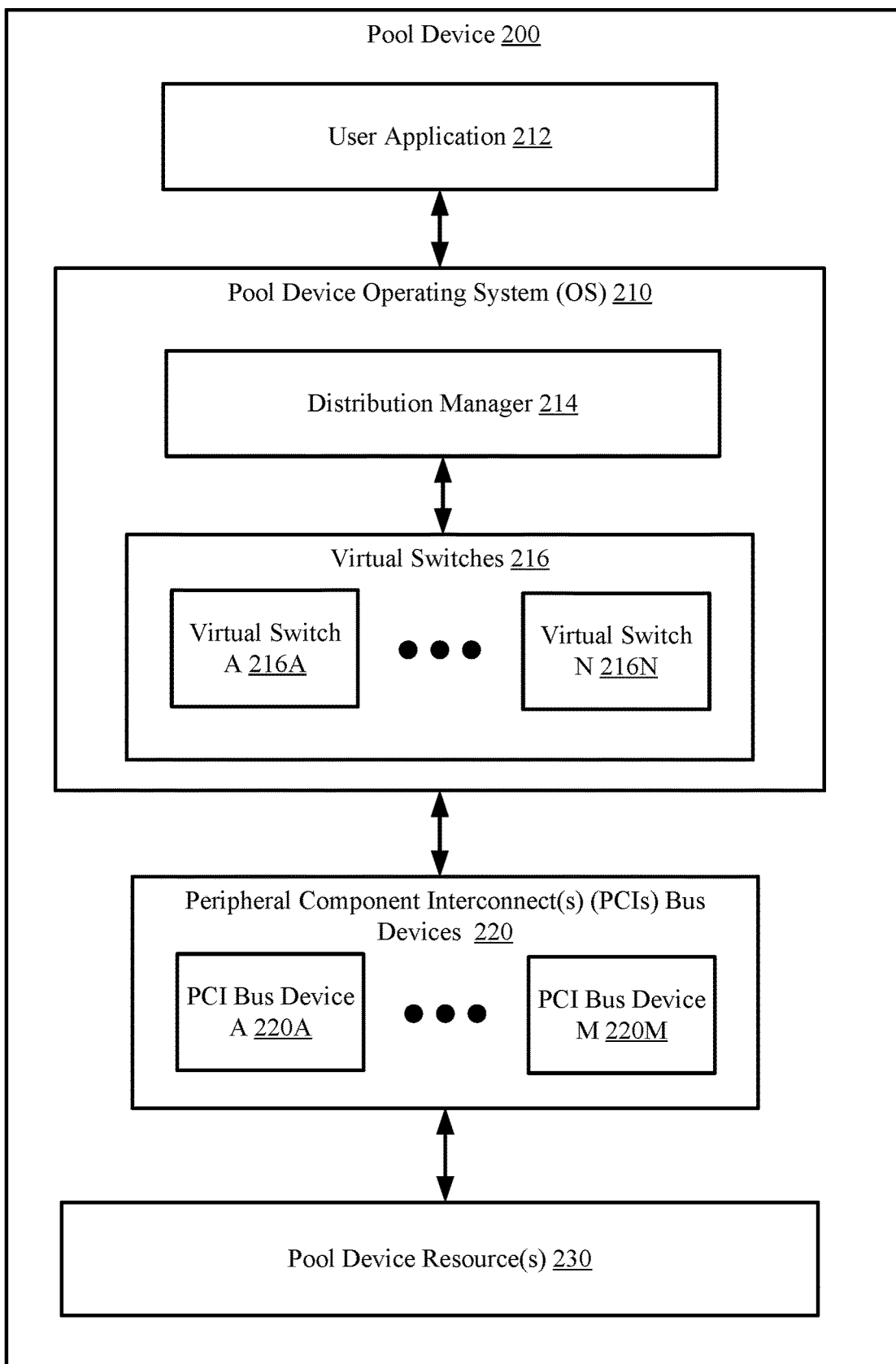
FIG. 2 shows a diagram of a pool device in accordance with one or more embodiments of the invention.

FIG. 2 shows a diagram of a pool device in accordance with one or more embodiments of the invention. The pool device (200) may be an embodiment of a pool device (100A, 100B, FIG. 1) discussed above. As discussed above, the pool device (200) utilizes pool device resources (i.e., local pool device resources) and pool device resources of other pool devices (also referred to as external pool device resources).

To perform the aforementioned functionality, the pool device (200) includes a user application (212), a pool device operating system (OS) (210), one or more PCI bus devices (220), and one or more pool device resources (230). The pool device (200) may include additional, fewer, and/or different components without departing from the invention. Each of the aforementioned components is discussed below.

In one or more embodiments of the invention, the user application (212) is a service operated by a user utilizing the pool device (212). The user application (212) may access the pool device resources (also referred to as local resources) (230) via the pool device OS (210). The user application may use the pool device resources (230) to perform one or more processes. Additionally, the user application may utilize the pool device resources of other pool devices (also referred to as PCI bus devices). The external pool device resources may be accessed via the pool device OS (210).

In one or more embodiments of the invention, the user application (212) is implemented as computing code stored on a persistent storage (e.g., 230) that when executed by a processor (e.g., 230) of the pool device (200) performs the functionality of the user application (212). The processor may be a hardware processor including circuitry such as, for example, a central processing unit or a microcontroller. The processor may be other types of hardware devices for processing digital information without departing from the invention.

In one or more embodiments of the invention, the pool device OS (210) is an operating system that manages the operation of the components in the pool device (200) (e.g., the user application (212)), the PCI bus devices (220), and the computing resources (230). The pool device OS (210) may orchestrate the communication between: (i) the PCI bus devices (220) connected to the pool device resources (230) and (ii) the user application (212) and/or any other computer code executing on the pool device (200).

In one or more embodiments of the invention, the pool device OS (220) is implemented as computer instructions, e.g., computer code, stored on a persistent storage that when executed by a processor(s) of the pool device (200) cause the pool device (200) to provide the functionality of the host OS (220) described throughout this application.

In one or more embodiments of the invention, the pool device OS (210) includes a distribution manager (214) that includes functionality for managing the pool device resource use of the user application (212). Specifically, the distribution manager (214) accesses a ledger service (e.g., 120, FIG. 1) to: (i) provide information about the PCI bus devices (e.g., 220A, 220M) that are on the pool device (200); (ii) provide information about the availability of the PCI bus devices enumerated in (i), and (iii) identify available PCI bus devices on other pool devices. Further, the distribution manager includes functionality for initiating access to the external pool device resources via virtual switches (216).

In one embodiment of the invention, the distribution manager (214) includes functionality to obtain ledger entries about PCI bus devices (220) located on the pool device (200) that have been reserved by another pool device. This information may then be used to prevent the user applications (212) on the pool device (200) from attempting to access and use a PCI bus device (220A, 220M) that has been reserved and/or used by another pool device. For example, when a PCI bus device is reserved by another pool device, the pool device OS may mask (or hide) the PCI bus device from the user application. In another example, when a PCI bus device is reserved by another pool device, the pool device OS may not mask (or hide) the existence of the PCI bus device but may deny access or use of the PCI bus device. The pool device OS may use any known or later discovered mechanism to perform the aforementioned functionality.

Figure 3A:
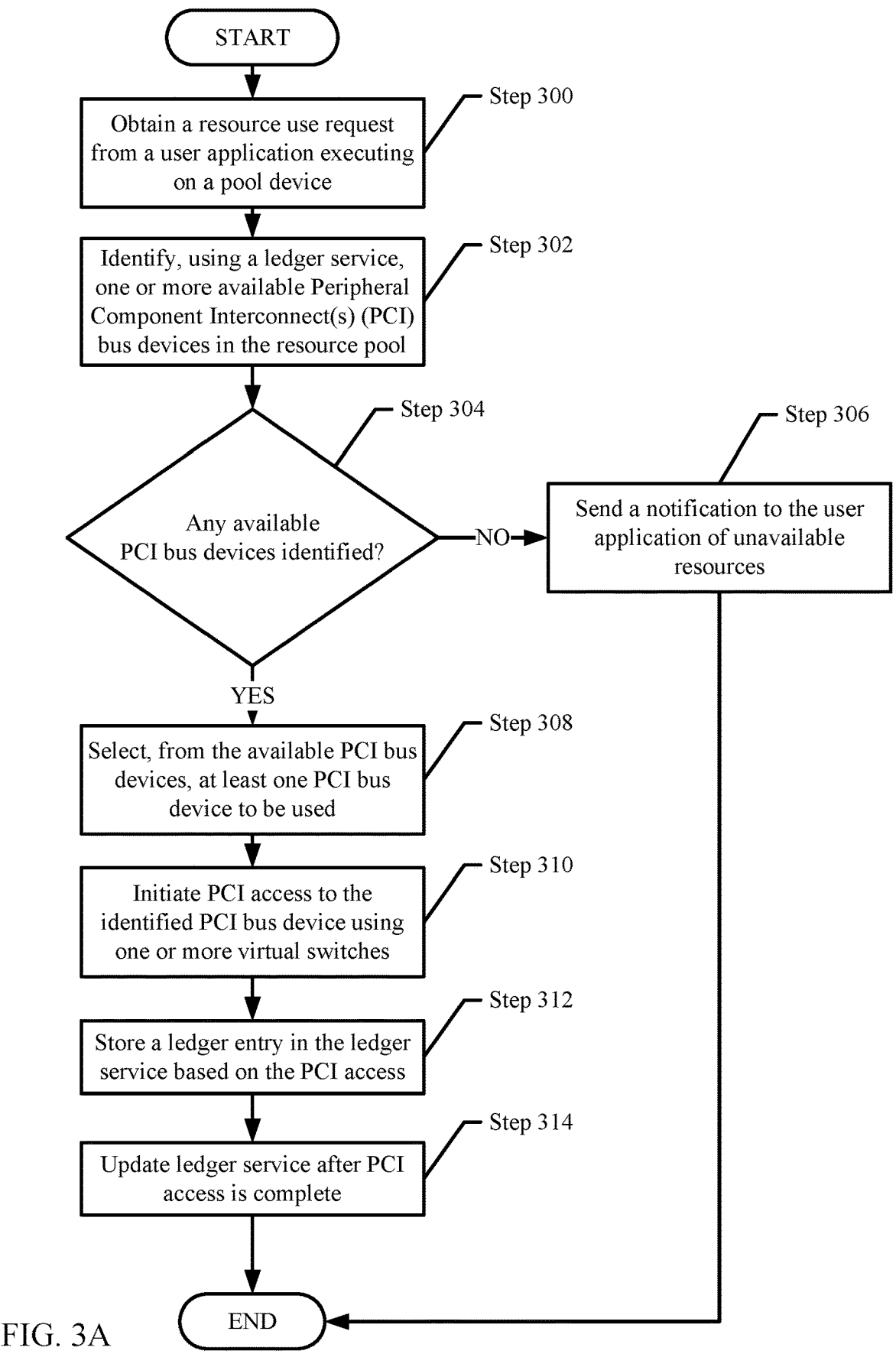
FIG. 3A shows a flowchart for pool device resource allocation in accordance with one or more embodiments of the invention.

In one or more embodiments of the invention, the distribution manager (214) is implemented as computing code stored on a persistent storage that when executed by a processor of the pool device (200) performs the functionality of the distribution manager (214) described throughout this application and/or all, or a portion thereof, of the method illustrated in FIG. 3A. The processor (not shown) may be a hardware processor including circuitry such as, for example, a central processing unit or a microcontroller. The processor may be other types of hardware devices for processing digital information without departing from the invention.

In one or more embodiments of the invention, the pool device OS (210) further includes virtual switches (216), managed by the distribution manager (214), that are used to access the PCI bus devices of a second pool device utilized by the user application (212). The virtual switches (214) may connect to other PCI bus devices via, for example, a pool device OS executing on the second pool device. Thus, the virtual switches (216) allow for the user application (212) to access and/or use PCI bus devices (and pool device resources accessible via the PCI bus devices) of other pool devices. In one embodiment of the invention, the virtual switches implement one or more networking protocols (e.g., transmission control protocol (TCP), Internet Protocol (IP), etc.) that facilitates the communication of data between the pool device and other pool devices.

In one or more embodiments of the invention, each virtual switch (216A, 216N) is implemented as computing code stored on a persistent storage device of the pool device (200) that when executed by a processor of the pool device (200) performs the functionality of the virtual switch (216A, 216N). The processor may be a hardware processor including circuitry such as, for example, a central processing unit or a microcontroller. The processor may be other types of hardware devices for processing digital information without departing from the invention.

In one or more embodiments of the invention, the pool device OS (210) accesses the pool device resources (230) using PCI bus devices (220). In one or more embodiments of the invention, a PCI bus device (220) is a hardware component that enables the transfer of data between the pool device resources (230) and the pool device OS (210) (which includes the virtual switches). The data received by the pool device OS from the PCI bus devices may be used by user applications on the pool device and/or transmitted, via the virtual switch(es) to other pool devices. Further, the pool device OS may receive data from user applications and/or from other pool devices (via the virtual switches) and transmit this information to the PCI bus devices.

In one embodiment of the invention, the PCI bus device is a hardware component(s) that implements all or a portion of the PCI Express standard. The PCI Express standard may be any version of the PCI Express standard that has been developed (e.g., PCI Express 1.0a, 1.1, 2.0, 2.1, 3.0, 3.1, 4.0, 5.0, 6.0) or that may be developed in the future. While this invention is described with respect to the PCI Express standard, the invention may be implemented using other physical bus communication mechanisms or standards that enable a pool device OS to interface with physical resources (also referred to as pool device resources) on a printed circuit board (PCB) (e.g., a motherboard).

In one or more embodiments of the invention, the pool device resources (230) are hardware devices that are connected to the PCI bus devices (220). The pool device resources (230) (also referred to as local resources in relation to the pool device) may be used by the pool device (200) and/or by other pool devices. The pool device resources (230) are accessed locally (e.g., by the pool device OS (210), the user application (212), etc.) via the PCI bus devices (220). The pool device resources (230) are accessed externally (e.g., by other pool devices) via the virtual switches (216) of the external pool devices.

In one or more embodiments of the invention, at least a portion of the pool device resources (230) are processors. The processors may be, for example, central processing units (CPUs) (either multi-core or single core), graphics processing units (GPUs), and/or any other types of processors without departing from the invention.

In one or more embodiments of the invention, at least a portion of the pool device resources (230) are memory devices. The memory devices may be, for example, random access memory (RAM), read-only memory (ROM), flash memory, and/or any other types of memory without departing from the invention.

In one or more embodiments of the invention, at least a portion of the pool device resources (230) are persistent storage. The persistent storage may be, for example, a solid state drive (SSD), hard-disk drives, and/or any other types of persistent storage without departing from the invention.

The invention may be implemented using other pool device resources without departing from the invention.

Figure 3B:
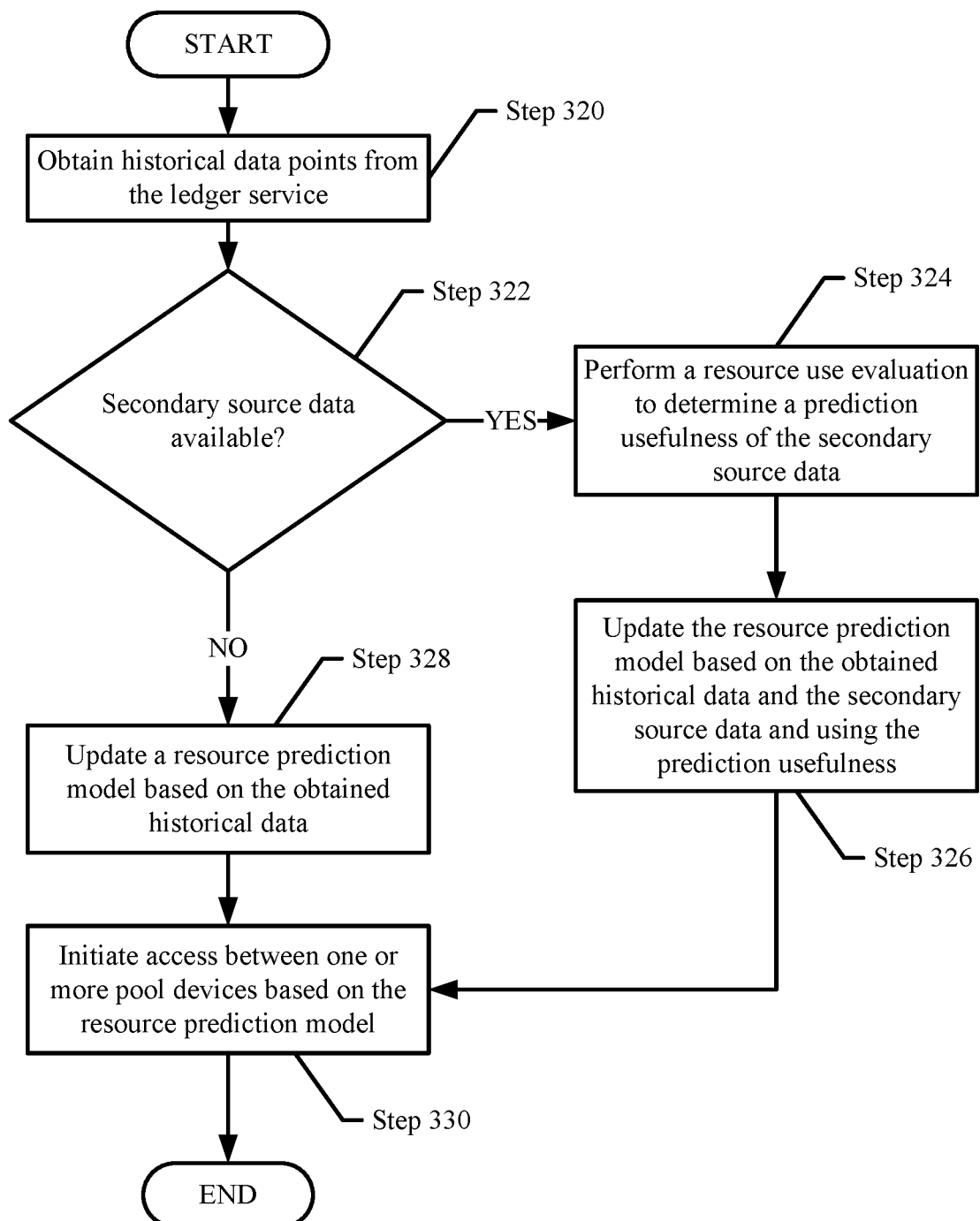
FIG. 3B shows a flowchart for performing a resource use prediction in accordance with one or more embodiments of the invention.
Figure 3C:
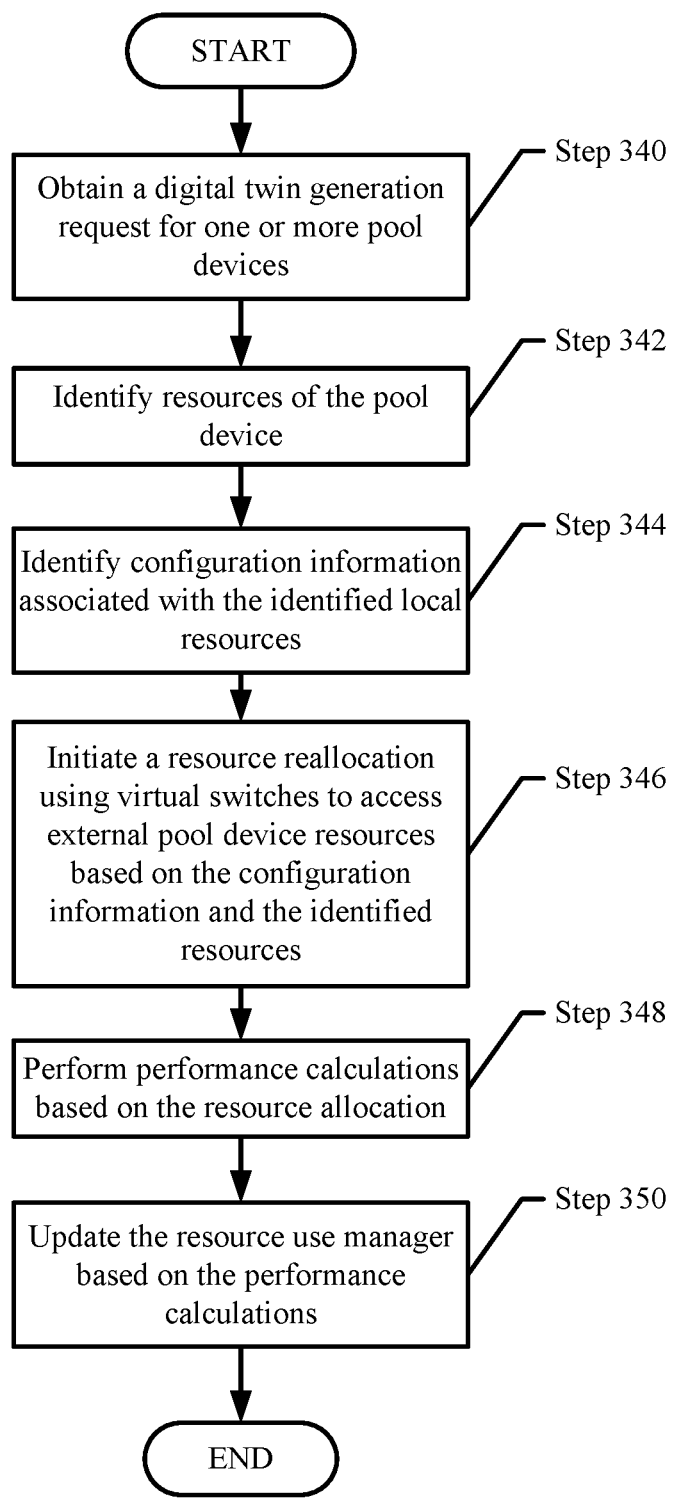
FIG. 3C shows a flowchart for generating a digital twin in accordance with one or more embodiments of the invention.

FIGS. 3A-3C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3C may be performed in parallel with any other steps shown in FIGS. 3A-3C without departing from the scope of the invention.

FIG. 3A shows a flowchart for pool device resource allocation in accordance with one or more embodiments of the invention. The method shown in FIG. 3A may be performed by, for example, a distribution manager (214, FIG. 2). Other components of the system illustrated in FIG. 2 or FIG. 1 may perform the method of FIG. 3A without departing from the invention.

Turning to FIG. 3A, in step 300, a resource use request is obtained from a user application. The user application may be executing on the pool device hosting the pool device OS. The resource use request may specify accessing external pool device resources for a specified period of time. The resource use request may specify the type(s) of pool device resources it would like to utilize (e.g., processors, memory, persistent storage, etc.).

In step 302, one or more available PCI bus devices are identified using a ledger service. In one or more embodiments of the invention, the distribution manager sends a request to the ledger service that specifies whether any PCI bus devices are available for use by the user application. The ledger service may provide, for example, a list of available PCI bus devices.

In step 304, a determination is made about whether any available PCI bus devices are identified. The determination in step 304 may include analyzing the list of available PCI bus devices provided by the ledger service and determining whether any of the available PCI bus devices satisfy the resource use request.

For example, the resource use request may specify using a processor for calculation and processing. The distribution manager may analyze the ledger entries in the ledger service to identify whether any PCI bus devices are connected to a processor in another pool device.

In one or more embodiments of the invention, the list provided by the ledger service may specify no available PCI bus devices. In such a scenario, the distribution manager may determine that no PCI bus devices are available.

If one or more PCI bus devices are available, the method proceeds to step 308; otherwise, the method proceeds to step 306.

In step 306, a notification is sent to the user application. The notification may be a message that specifies that there are no available PCI bus devices for use. The process may then end.

In step 308, at least one PCI bus device is selected to be used. In one or more embodiments of the invention, if more than one PCI bus device is available, the distribution manager may select based on, for example, the capability of the available pool device resources connected to the PCI bus devices (e.g., selecting the processor with the largest number of processing cores). In one or more embodiments of the invention, the PCI bus devices are selected at random.

In one or more embodiments of the invention, the PCI bus device is selected by the user application. For example, the distribution manager may send a selection of options for available PCI bus devices to the user application. The user application may respond with the selected PCI bus device(s).

The PCI bus device may be selected from a set of PCI bus devices using any other selection mechanism without departing from the invention In step 310, PCI access is initiated between the identified PCI bus device and the user application using one or more virtual switches. In one or more embodiments of the invention, the distribution manager sends a command to the virtual switch to connect (or facilitate connection or access by) the virtual switch to the selected PCI bus device(s) via requests sent to an operating system executing on the pool device of the selected PCI bus device(s). The request may specify accessing the selected PCI bus device for a predetermined period of time.

In one or more embodiments of the invention, the virtual switch connects directly to the selected PCI bus device(s) without use of the pool device OS of the selected PCI bus device(s). In such embodiments, the user application accesses the pool device resources of a second pool device independently from the pool device OS of the second pool device.

In step 312, a ledger entry is stored in the ledger service based on the PCI access. In one or more embodiments of the invention, the ledger entry may specify (i) the selected PCI bus device; (ii) pool device (or user application executing on the pool device) that has reserved the PCI bus device is accessing the external pool device resources, (iii) a timestamp that specifies the time at which the PCI bus device is being reserved and, optionally, the duration of the reservation of the pool device. The ledger entry may include additional and/or different information without departing from the invention.

In step 314, the ledger service is updated after the PCI access is complete. In one or more embodiments of the invention, the distribution manager identifies the access as complete by obtaining a notification from the user application that the user application is no longer utilizing the external PCI bus device(s). Alternatively, the distribution manager may monitor the data transmission between the virtual switch providing the access and the external pool device. When the distribution manager identifies that data transmission is no longer occurring, it may determine that the access is complete.

After the access to the external PCI bus device(s) is complete, the ledger service may update the ledger entry to specify that the external pool device resources are available for use again. The ledger entry generated in step 312 may be stored as a historical data point for future use. In this manner, the ledger service is up-to-date with the availability of PCI bus devices and the pool device resources connected to them. This may enable the ledger service to provide accurate information about the availability of pool device resources to all pool devices and/or user applications in one or more resource pools.

FIG. 3B shows a flowchart for performing a resource use prediction in accordance with one or more embodiments of the invention. The method shown in FIG. 3B may be performed by, for example, a resource use manager (140, FIG. 1). Other components of the system illustrated in FIG. 1 may perform the method of FIG. 3B without departing from the invention.

In step 320, historical data points are obtained from the ledger service. In one or more embodiments of the invention, the historical data points are obtained by a telemetry service of the resource use manager. The telemetry service may obtain the historical data points based on a policy that specifies obtaining historical data points at a specified interval (e.g., every day, every hour, every seven days, etc.). In other embodiments, the historical data is obtained in response to a request by, for example, a user application, which requests a prediction of future pool device resource reallocations.

In step 322, a determination is made about whether secondary source data is available. The determination may be based on whether secondary source data has been obtained and is stored by the resource use manager. If secondary source data is available, the method proceeds to step 324; otherwise, the method proceeds to step 324.

In step 324, a resource use evaluation is performed on the secondary source data to determine a prediction usefulness of the secondary source data. In one or more embodiments of the invention, the resource use evaluation is based on characteristics obtained by the resource use manager.

The characteristics may specify how to determine whether secondary source data is useful. The characteristics may specify, for example, a relevance of the source data to the resource reallocation, a reliability of the secondary source providing the secondary source data, a potential impact of the secondary source data to the resource reallocation, and/or other characteristics without departing from the invention. The characteristics may be set by the resource use manager, an administrator, or other entity, managing the resource use manager, and/or any other entity without departing from the invention.

In one or more embodiments of the invention, the result of the resource use evaluation is a set of one or more values that represent the usefulness of the secondary source data. For example, a prediction usefulness may be represented by a numerical value where the higher the value corresponds to more useful secondary source data.

In step 326, a resource prediction model is updated based on the obtained historical data and the secondary source data and using the prediction usefulness. In one or more embodiments of the invention, the prediction model is generated by performing a machine learning algorithm with the historical data points, the secondary source data, and the usefulness of the secondary source data as inputs. The result of applying the machine learning algorithm may be an output. The output may be, for example, a likelihood that resources are to be reallocated at a specified point in time. As another example, the output may be a frequently used pool device resource of a pool device that is likely to be reallocated (e.g., utilized by a secondary user application) in the future.

In one or more embodiments of the invention, the machine learning algorithm is a multiple linear regression algorithm. In one or more embodiments of the invention, the multiple linear regression algorithm is a function that models a linear relationship between multiple inputs (e.g., pool device resource use of a PCI bus device) and an output (e.g., a likelihood that the PCI bus device is to be used at a specified point in time). In various embodiments of the invention, the machine learning algorithm is customized to include the selected features (which in this embodiment correspond to the historical data points). The training data (e.g., the historical data points, the secondary source data, and the prediction usefulness) is then applied to the customized machine learning algorithm to determine the appropriate parameters. The parameters may be used as the resource prediction model.

The prediction model may specify, for example, a relationship between inputs such as, for example, one or more pool devices, a time period, and/or a likelihood that a PCI bus device connected to an external pool device resource is to be used by the pool device(s) during that time period.

Other machine learning algorithms may be used without departing from the invention. For example, the invention may be implemented using one of the following other machine learning algorithms without departing from the invention: Linear Regression, Logistic Regression, Decision Tree, SVM, Naive Bayes, kNN, K-Means, Random Forest, Dimensionality Reduction Algorithms, and Gradient Boosting algorithms.

In step 328, following the determination that no secondary source data is available, the resource prediction model is updated based on the obtained historical data. In one or more embodiments of the invention, the resource prediction model is generated similarly to that of step 326. The difference may be that the machine learning algorithm is not applied to secondary source data. In other words, only the historical data points are used as input to the machine learning model. The result is a resource prediction model.

In step 330, access between one or more pool devices is initiated based on the resource prediction model. In one or more embodiments of the invention, after applying the resource prediction model to one or more inputs, if the output specifies a high likelihood that a PCI bus device connected to a pool device resource is to be used at a specified time period, the prediction service of the resource use manager may, at a point in time just before the specified time period, send a resource use request to a distribution manager of the pool device that specifies accessing PCI bus devices of one or more pool devices. In this manner, the access is provided to a user application before the user application sends a resource use request, thus reducing latency between the need to access external pool device resources and the access.

FIG. 3C shows a flowchart for generating a digital twin in accordance with one or more embodiments of the invention. The method shown in FIG. 3C may be performed by, for example, a digital twin service (160, FIG. 1). Other components of the system illustrated in FIG. 1 may perform the method of FIG. 3C without departing from the invention.

In step 340, a digital twin generation request is obtained for one or more pool devices. The digital twin generation request may specify generating a digital twin of one or more pool devices. Further, the digital twin generation request may specify generating a digital twin of one or more resource pools (e.g., groupings of pool devices). The digital twin generation may be obtained from a user application.

In step 342, resources of the pool device(s) are identified. The resources include the PCI bus devices that are being locally used by the pool devices as well as the PCI bus devices on other pool devices that are being used by the pool device(s). For example, if Pool Device A is using local PCI Bus Device 1 and external PCI Bus Device 2 on Pool Device B, then step 342 includes identifying PCI Bus Device 1 and PCI Bus Device 2. In one or more embodiments of the invention, local resources are the pool device resources executing on each of the specified pool devices.

In step 344, configuration information is identified associated with the identified resources. In one or more embodiments of the invention, the configuration information may specify how each pool device is configured to operate. The configuration information of a pool device may specify, for example, the pool device OS, network settings of the pool device, a boot sequence for booting the pool device, and/or any other configuration information without departing from the invention.

In one or more embodiments of the invention, the configuration information is obtained by communicating with the corresponding pool device(s). The communication may include sending requests for the configuration information and obtaining responses that specify the requested configuration information.

In step 346, a resource reallocation is initiated using virtual switches to access PCI bus devices connected to external pool device resources based on the configuration information and the identified resources. In one or more embodiments of the invention, the resource reallocation includes accessing external pool device resources that generate the digital twin.

The external pool device resources may be used to generate a digital twin that models the specified pool device(s) using the identified resources and the configuration information of the specified pool device(s). The result of modeling the specified pool device(s) based on the identified resources and the configuration information is a digital twin of the specified pool device(s).

In step 348, performance calculations are performed based on the resource allocation. In one or more embodiments of the invention, the performance calculations are performed on the external pool device resources modeling the specified pool device(s). The performance calculations may include, for example, performing a simulation about the behavior of the digital twin while undergoing a set of conditions and recording the results of the digital twin based on the simulation. The performance calculations may be performed via other methods without departing from the invention.

In step 350, the resource use manager is updated based on the performance calculations. In one or more embodiments of the invention, the results of the performance calculations may be stored in the resource use manager.

Example 1—PCI Bus Device Reservation

Figure 4A:
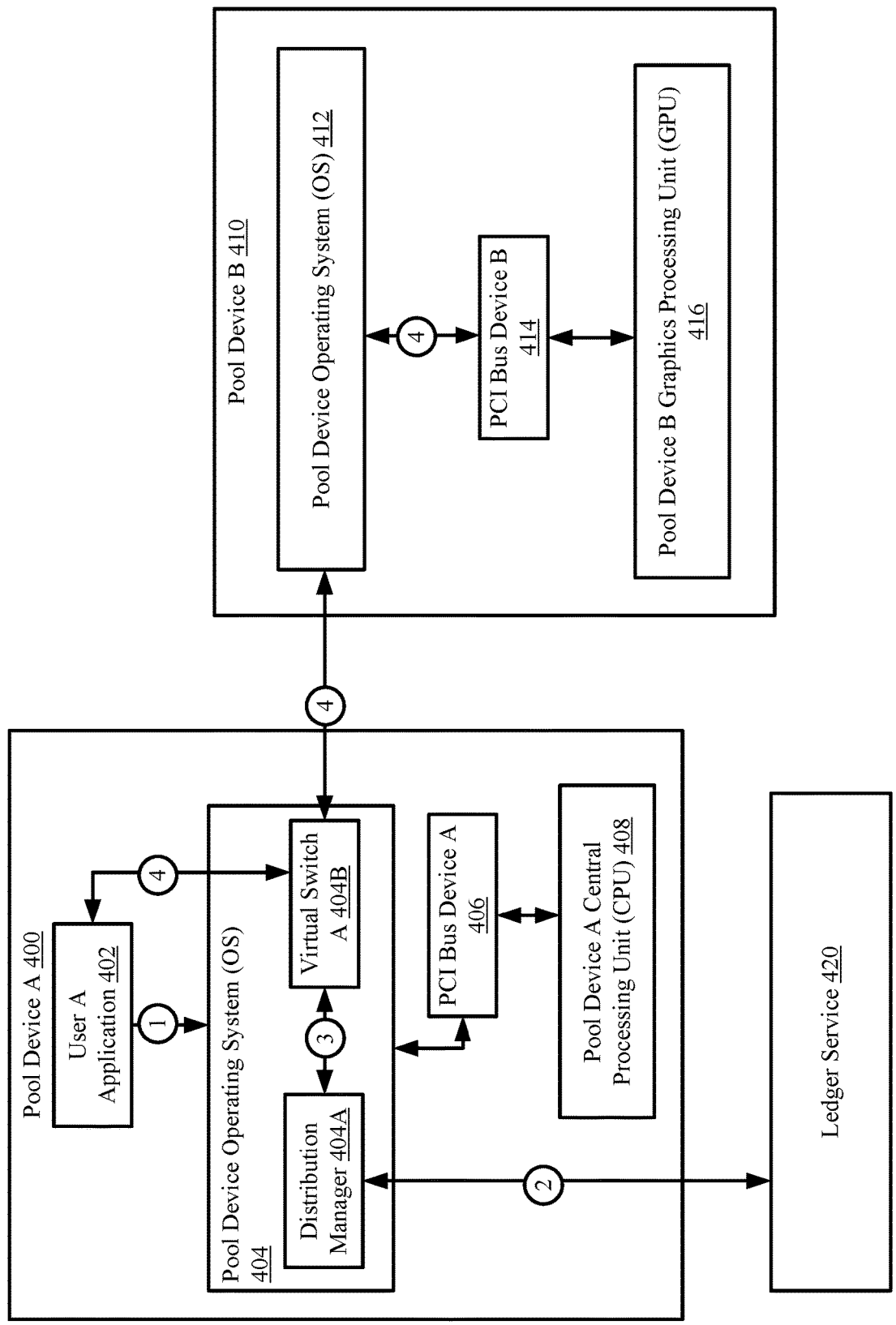
FIGS. 4A-4C show examples in accordance with one or more embodiments of the invention.

The following section describes an example. The example, illustrated in FIG. 4A, is not intended to limit the invention and is independent from any other examples discussed in this application. Turning to the example, consider a scenario in which a pool device would like to access and utilize external pool device resources.

FIG. 4A shows an example system in accordance with one or more embodiments of the invention. For the sake of brevity, not all components of the example system may be illustrated. The example system includes two pool devices (400, 410) and a ledger service (420).

A user application A (402) executing on pool device A (400) is executing data processing on data using a local CPU (408), accessed via pool device OS (404) accessing a PCI bus device A (406) connected to the pool device A CPU (408). Based on the data processing demand of the user application (402), the user application determines that the pool device A CPU (408) is not sufficient, and sends a resource use request to the pool device A OS (404) to obtain additional computing resources [1]. The resource use request may be to utilize a graphics processing unit (GPU) for additional data processing.

A distribution manager (404A) operating in the OS (404) communicates with a ledger service (420) to identify any available PCI bus devices connected to a GPU [2]. The ledger service may send a response that specifies a PCI Bus device B (414) connected to a GPU (416) on pool device B.

The distribution manager (404A), based on the response, initiates access to PCI bus device B (414) [3]. The access is initiated by sending a command to a virtual switch (404B) operating in pool device A OS (404). The command specifies connecting to PCI bus device B (414) via a pool device B OS (412). The virtual switch (404B), in response to the command, communicates with the pool device OS (412) to access PCI bus device B (414), and connects to the user application (402) so that the user application has access to the GPU (416) via the virtual switch (404B) [4].

The user application may execute the data processing using both the local pool device A CPU (408) and the external pool device B GPU (416). During this access, a ledger entry is generated and stored in the ledger service (420). The ledger entry specifies that PCI bus device B (414) is not available for use by other user applications. After the user application completes the access of PCI bus device B (414), the ledger service (420) is further updated to specify that PCI bus device B (414) is available for use.

End of Example 1

Example 2—Resource Pool Prediction

Figure 4B:
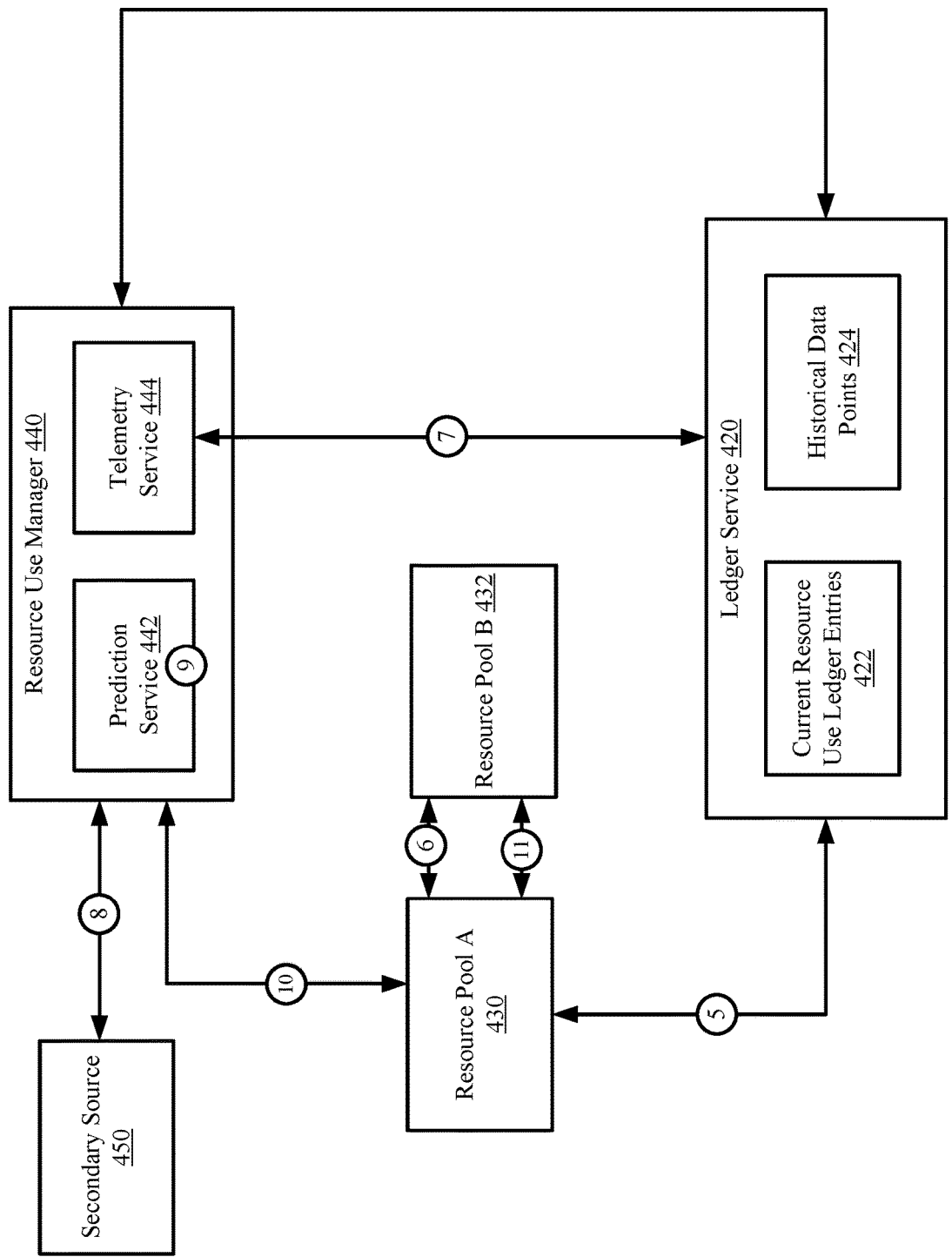

The following section describes an example. The example, illustrated in FIG. 4B, is not intended to limit the invention and is independent from any other examples discussed in this application. Turning to the example, consider a scenario in which a resource use manager monitors the resource use of a resource pool.

FIG. 4B shows an example system in accordance with one or more embodiments of the invention. For the sake of brevity, not all components of the example system may be illustrated. The example system includes two resource pools (430, 432), a ledger service (420), a resource use manager (440), and a secondary source (450).

Resource pool A (430) includes multiple pool devices (not shown) that process transactions at a coffee shop that is located in the east coast of the continental United States. During a time period of 6:00 am to 9:00 am Eastern Standard Time (EST), the resource pool requires additional pool device resources to process a large quantity of transactions that occur during that time. The large quantity of transactions may be due to a large number of people ordering coffee right before going to work. Resource pool A (430) communicates with the ledger service (420) to identify any available CPUs to be used by resource pool A (430) [5]. The ledger service specifies that the CPUs in resource pool B (432) are available for use. Resource pool A (430) accesses the CPUs of resource pool B (432) during the specified time (i.e., 6:00 am to 9:00 am EST) [6].

After the access is complete, the access is specified as a historical data point stored in the ledger service (420). The access of the pool device resource in resource pool B (432) by resource pool A (430) may be repeated for three straight days at the same specified time. Each iteration of the access may be specified as historical data points (424).

At a later point in time, a telemetry service (444) of the resource use manager (440) obtains the historical data points (424) of the ledger service (420) [7]. Further, the resource use manager (440) obtains secondary source data from a secondary source (450). The secondary source data specifies that inclement weather (i.e., a thunderstorm) is predicted to occur in the area of the coffee shop the following day for the entire morning (i.e., 5:00 am to 11:00 am). This inclement weather may impact the number of people going into work that day.

The resource use manager (440) utilizes the obtained historical data points (424) and the secondary source data obtained from the secondary source (450) to generate a prediction model via a prediction service (442) [9].

Specifically, the prediction service (442) performs a resource use evaluation to evaluate the usefulness of the secondary source data. The resource usefulness is determined to be of medium value. The prediction service (442) performs the machine learning algorithm with the historical data points, the secondary source data, and the resource usefulness as training data to obtain parameters used as the resource prediction model. The prediction service inputs the resource pool A (430) and the specified time period to obtain a likelihood that resource pool A (430) will need to use the pool device resources of resource pool B (432). The output results in a high likelihood.

Based on the result, the resource use manager (440) initiates access between resource pool A (430) and the CPUs of resource pool B (432) at 5:50 am EST [11]. In this manner, resource pool A (430) will already have access to the CPUs of resource pool B (432) by 6:00 am EST. Resource pool A (430) subsequently utilizes the external pool device resources until 9:00 am EST [11].

End of Example 2

Example 3—Digital Twin Generation

Figure 4C:
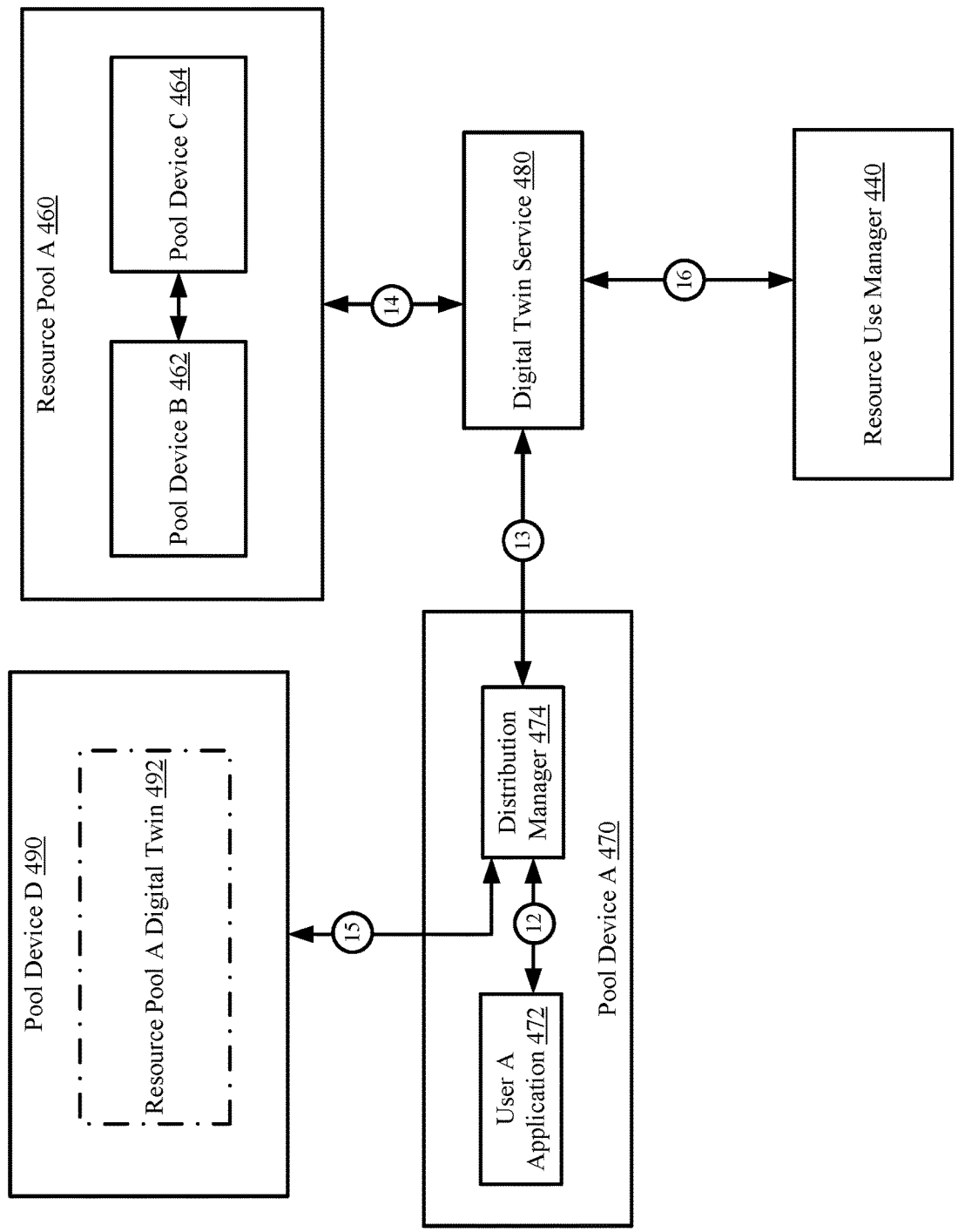

The following section describes an example. The example, illustrated in FIG. 4C, is not intended to limit the invention and is independent from any other examples discussed in this application. Turning to the example, consider a scenario in which a user application would like to generate a digital twin of a resource pool to simulate the behavior of the resource pool under predetermined conditions.

FIG. 4C shows an example system in accordance with one or more embodiments of the invention. For the sake of brevity, not all components of the example system may be illustrated. The example system includes a resource pool (460) that include two pool devices (462, 464), two additional pool devices (470, 490), a resource use manager (440), and a digital twin service (480).

A user application (472) operating on pool device A (470) may request to generate a digital twin of pool device B (462). The user application (472) sends a request to the distribution manager (474) [12] that specifies generating a digital twin of pool device B (462). The distribution manager (474) sends a digital twin generation request to the digital twin service (480) [13].

The digital twin service (480), in response to the digital twin generation request, communicates with the resource pool (460) to identify the resources in the pool devices (462, 464) of the resource pool (460) and the configuration information of the pool devices (462, 464) [14]. The resources may include a four-core processor for each pool device (462, 464), eight gigabytes (GB) of RAM for each pool device, and 10 GB per second of network bandwidth between each pool device (462, 464) in resource pool A (460). Additionally, the resources may include the PCI bus device of pool device B (462) being used by pool device C (464). The resource may specify the network connectivity between the pool devices (462, 464). The configuration information specifies the pool device OS of pool device B (462) and the network protocol between pool device B (462) and pool device C (464).

After identifying the resources and obtaining the configuration information of pool device B (462), the digital twin service (480) initiates access to a pool device D (490) that generates a digital twin of pool device B (462) based on the obtained information [15]. The user application (472), via the distribution manager (474), accesses the pool device resources of pool device D (490) to run a simulation of the digital twin (492). The simulation includes analyzing any configuration issues in pool device B (462) via the digital twin (492), make changes to the digital twin (492) in order to resolve the configuration issues, analyze the response of the digital twin (492) (e.g., how the changes affect network traffic or bandwidth between pool device B (462) and pool device C (464)) based on the changes made, and provide the response to pool device A (470). Pool device A (470) may prompt the digital twin service (480) to store a record of the simulation and the response in the resource use manager (440) [16].

End of Example 3

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention optimize the pool device resource use of multiple computing devices by enabling each computing device to directly access the pool device resources of a second computing device. Embodiments of the invention utilize a ledger service that monitors the access and requests to access the external pool device resources of the computing devices to prevent overuse of a pool device resource. Prior to the invention, pool device resources in a system of computing devices may go unused while other pool device resources may be overused. Embodiments of the invention enable the system to reduce the load on the overused pool device resources by accessing the unused pool device resources.

Further, embodiments of the invention utilize machine learning and/or other algorithms to predict future resource reallocations. This may enable the system to initiate access between a pool device (which may be a computing device) and external pool device resources prior to the pool device requesting the external pool device resources, thus reducing latency and increasing efficiency.

Further, embodiments of the invention include generating digital twins of a pool device. The digital twins may be used for troubleshooting and/or further prediction purposes. The use of digital twins for troubleshooting and/or prediction purposes may enable the system to identify the behavior of a pool device or resource pool without making any changes to the actual pool devices and/or resource pools. This may allow a secondary entity executing the simulations to identify the problems and/or future behavior of the pool devices and/or resource pools being simulated while maintaining the integrity of the aforementioned pool devices and/or resource pools.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing pool device resources, the method comprising:
obtaining, by a digital twin service, a digital twin generation request from a distribution manager, wherein the digital twin generation request specifies a pool device in a resource pool;

in response to the digital twin generation request:
identifying a plurality of PCI bus devices being used by the pool device associated with the digital twin generation request;
obtaining configuration information associated with the plurality of PCI bus devices from a second distribution manager of the pool device, wherein the configuration information specifies an operating system of the pool device, and whether a PCI bus device in the plurality of PCI bus devices is local to the pool device;
initiating a resource allocation using a virtual switch to access a peripheral component interconnect (PCI) bus device on a second pool device based on the configuration information and the plurality of PCI bus devices, wherein the resource pool further comprises the second pool device;
performing performance calculations on the PCI bus device based on the resource allocation; and
storing a result of the performance calculations in a resource use manager,
wherein the performance calculations are used by the resource use manager to update a resource prediction model generated using a machine learning algorithm, and
wherein the distribution manager is executing on a third pool device, and wherein the resource pool further comprises the third pool device.

2. The method of claim 1, wherein initiating the resource allocation comprises:
identifying an availability of the PCI bus device on the second pool device;
sending the configuration information and an identifier of each of the plurality of PCI bus devices; and
prompting the second pool device to generate a digital twin based on the configuration information and the identifier of each of the plurality of PCI bus devices.

3. The method of claim 2, wherein the performance calculations are based on a simulation performed on the digital twin.

4. The method of claim 2, wherein the plurality of PCI bus devices comprises at least one of: a second PCI bus device in the pool device, and a third PCI bus device used on the third pool device.

5. The method of claim 4, wherein the at least one of the plurality of PCI bus devices is connected to at least one of: a processor, memory, or persistent storage.

6. The method of claim 1, wherein the result of the performance calculations is stored in a resource use manager.

7. The method of claim 1, wherein the digital twin generation request is obtained from the second pool device.

8. A non-transitory computer readable medium comprising computer readable program code, which when executed by a computer processor enables the computer processor to perform a method, the method comprising:
obtaining, by a digital twin service, a digital twin generation request from a distribution manager, wherein the digital twin generation request specifies a pool device in a resource pool;
in response to the digital twin generation request:
identifying a plurality of PCI bus devices being used by the pool device associated with the digital twin generation request;
obtaining configuration information associated with the plurality of PCI bus devices from a second distribution manager of the pool device, wherein the configuration information specifies an operating system of the pool device, and a PCI bus device in the plurality of PCI bus devices is local to the pool device;
initiating a resource allocation using a virtual switch to access a peripheral component interconnect (PCI) bus device on a second pool device based on the configuration information and the plurality of PCI bus devices, wherein the resource pool further comprises the second pool device;
performing performance calculations on the PCI bus device based on the resource allocation; and
storing a result of the performance calculations in a resource use manager,
wherein the performance calculations are used by the resource use manager to update a resource prediction model generated using a machine learning algorithm, and
wherein the distribution manager is executing on a third pool device, and wherein the resource pool further comprises the third pool device.

9. The non-transitory computer readable medium of claim 8, wherein initiating the resource allocation comprises:
identifying an availability of the PCI bus device on the second pool device;
sending the configuration information and an identifier of each of plurality of PCI bus devices; and
prompting the second pool device to generate a digital twin based on the configuration information and the identifier of each of the plurality of PCI bus devices.

10. The non-transitory computer readable medium of claim 9, wherein the performance calculations are based on a simulation performed on the digital twin.

11. The non-transitory computer readable medium of claim 9, wherein the plurality of PCI bus devices comprises at least one of: a second PCI bus device in the pool device, and a third PCI bus device used on the third pool device.

12. The non-transitory computer readable medium of claim 11, wherein the at least one of the plurality of PCI bus devices is connected to at least one of: a processor, memory, or persistent storage.

13. The non-transitory computer readable medium of claim 8, wherein the result of the performance calculations is stored in a resource use manager.

14. The non-transitory computer readable medium of claim 8, wherein the digital twin generation request is obtained from the second pool device.

15. A digital twin service programmed to:
obtain, by the digital twin service, a digital twin generation request from a distribution manager, wherein the digital twin generation request specifies a pool device in a resource pool;
in response to the digital twin generation request:
identify a plurality of PCI bus devices being used by the pool device associated with the digital twin generation request;
obtain configuration information associated with the plurality of PCI bus devices from a second distribution manager of the pool device, wherein the configuration information specifies an operating system of the pool device, and whether a PCI bus device in the plurality of PCI bus devices is local to the pool device;
initiate a resource allocation using a virtual switch to access a peripheral component interconnect (PCI) bus device on a second pool device based on the configuration information and the plurality of PCI bus devices, wherein the resource pool further comprises the second pool device;
perform performance calculations on the PCI bus device based on the resource allocation; and
store a result of the performance calculations in a resource use manager,
wherein the performance calculations is used by the resource use manager to update a resource prediction model generated using a machine learning algorithm, and
wherein the distribution manager is executing on a third pool device, and wherein the resource pool further comprises the third pool device.

16. The digital twin service of claim 15, wherein initiating the resource allocation comprises:
identifying an availability of the PCI bus device on the second pool device;
sending the configuration information and an identifier of each of plurality of PCI bus devices; and
prompting the second pool device to generate a digital twin based on the configuration information and the identifier of each of the plurality of PCI bus devices.

17. The digital twin service of claim 16, wherein the performance calculations are based on a simulation performed on the digital twin.

18. The digital twin service of claim 16, wherein the plurality of PCI bus devices comprises at least one of: a second PCI bus device in the pool device, and a third PCI bus device used on the third pool device.

19. The digital twin service of claim 18, wherein the at least one of the plurality of PCI bus devices is connected to at least one of: a processor, memory, or persistent storage.

20. The digital twin service of claim 15, wherein the result of the performance calculations is stored in a resource use manager.

* * * * *